Figure 1:
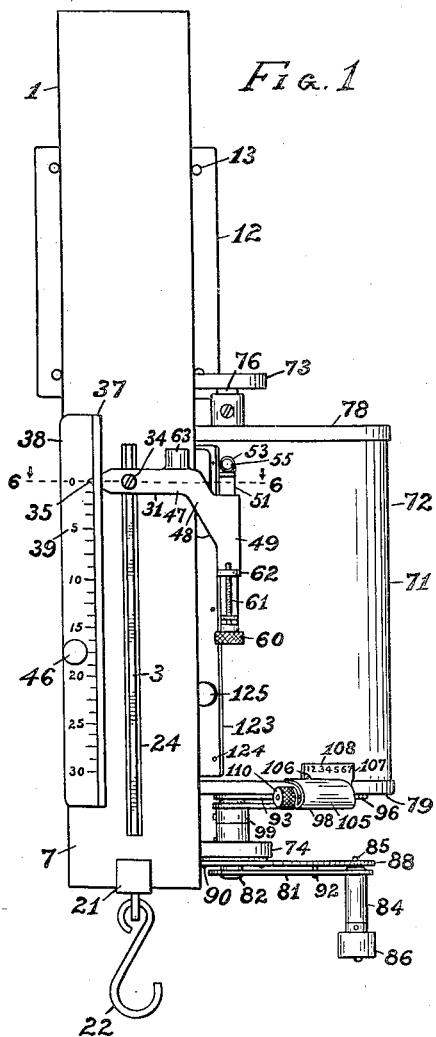

April 25, 1950 E. C. KOSTER 2,505,552
MILK WEIGHING AND RECORDING MACHINE
Filed April 11, 1945 2 Sheets-Sheet 1

Inventor
Edward C. Koster
By G. E. Dunstan,
his Attorney

April 25, 1950     E. C. KOSTER     2,505,552
MILK WEIGHING AND RECORDING MACHINE
Filed April 11, 1945     2 Sheets-Sheet 2
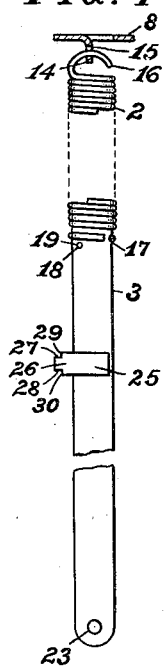
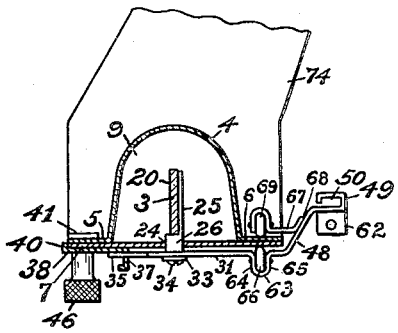
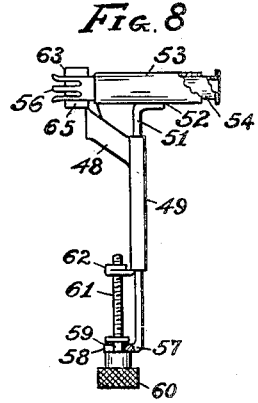
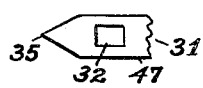
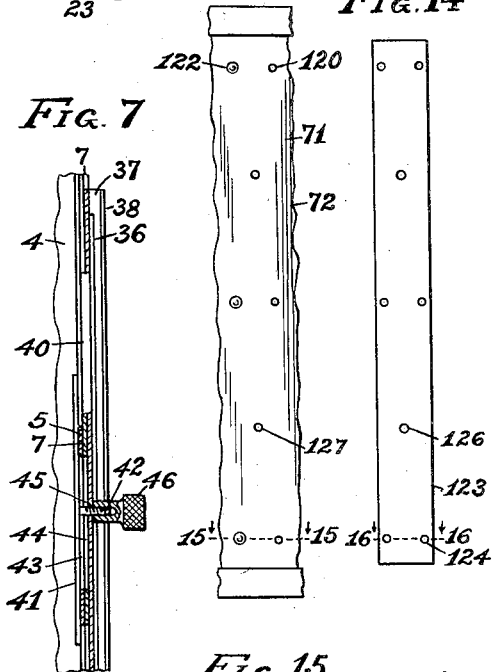
Inventor
Edward C. Koster Patented Apr. 25, 1950

2,505,552

UNITED STATES PATENT OFFICE 2,505,552

MILK WEIGHING AND RECORDING MACHINE

Edward C. Koster, Shaker Heights, Ohio

Application April 11, 1945, Serial No. 587,768

7 Claims. (Cl. 265—5)

This invention relates to weighing and registering machines and more particularly to scales for weighing the separate milkings from cows and providing for the quick and easy recording of same.

The main object of the invention is to provide a weighing machine of the above character which is convenient for use in weighing the milk in the milking pail as taken from a certain cow of a dairy herd and at the same time automatically moving a lead pencil to a portion of a record sheet corresponding to the weight of the milk for the ready pressing, by the milker, of the pencil against said record sheet and rotation thereof to mark a dot thereon.

Another object of the invention is to provide a weighing machine of the above character which will weigh and provide for the marking of a record for each cow of the herd for a desired period of time.

Another object of the invention is to provide a machine of the above character which will provide a record for a period of successively selected days, months or years.

Another object of the invention is to provide a machine of the above character which is convenient to set for any particular cow or for any record period desired.

Another object of the invention of the above character which when adjusted for a definite day of a week and a definite week of a month for one cow is adjusted likewise for all cows of the herd for the same period.

And another object of the invention is to provide a machine of the above character which is simple in construction, accurate in operation, and convenient to set for each record period and for each cow to be milked.

With the above and other objects in view, the invention will be hereinafter fully described with reference to the accompanying drawings and the novel features of the invention will be particularly pointed out in the appended claims.

Figure 2:
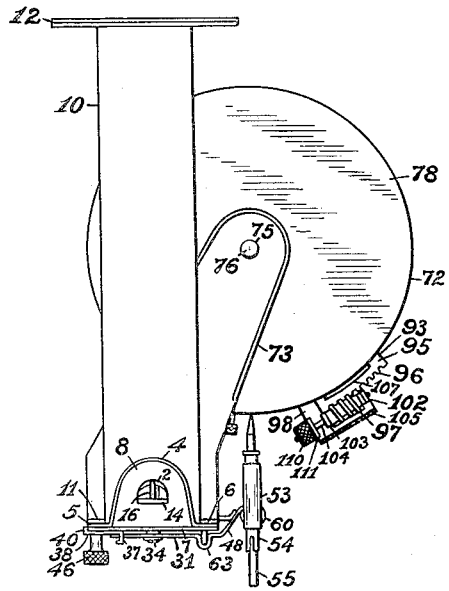
Figure 3:
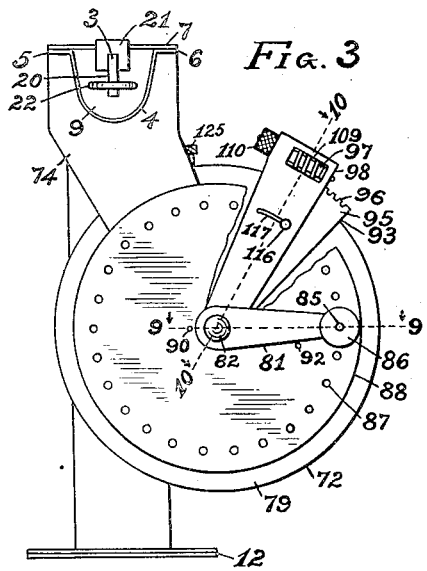
Figure 17:
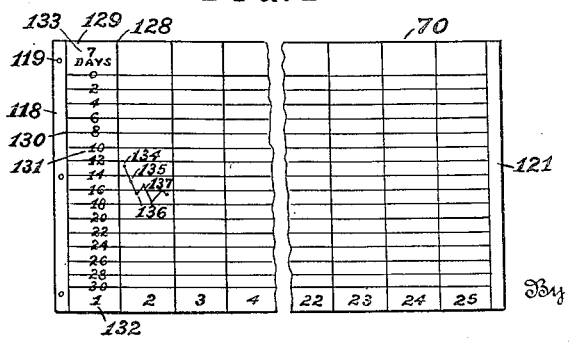

In the drawings,

Figure 1 is a front elevation of a milk weighing and registering machine constructed in accordance with my invention, Fig. 2 is a plan view thereof, Fig. 3 is a bottom plan view of the machine, the circular lock plate being broken away to better show the period index lever, Fig. 4 is a side view of the scale spring and suspension bar, Fig. 5 is a face view of the pointed end of the cross-arm, Fig. 6 is a cross sectional view, on an enlarged scale, of the coiled spring housing taken on line 6—6 of Fig. 1, the pencil supporting and adjusting means being omitted, Fig. 7 is a side view of a portion of the coiled spring housing and the adjustable weight indicating plate looking towards the left of Fig. 6, certain parts being in section, Fig. 8 is a side view of the pencil supporting and adjusting means looking to the left of Fig. 6, Fig. 9 is a cross sectional view, on an enlarged scale, of the crank lever for rotating the drum, and associated parts, taken on 9—9 of Fig. 3, Fig. 10 is a similar view of the index lever for actuating the drum to the next period position, taken on line 10—10 of Fig. 3, Fig. 11 is a longitudinal section view of the nut on the worm shaft and the bearing lug, taken on line 11—11 of Fig. 12, Fig. 12 is a face view of the bearing lug showing recesses for the index ball, Fig. 13 is the portion of the drum to which the record sheet is attached, Fig. 14 is a front view of the clamp for the record sheet, Fig. 15 is a cross sectional view taken on line 15—15 of Fig. 13, Fig. 16 is a similar view taken on line 16—16 of Fig. 14, and Fig. 17 illustrates the record sheet.

Referring to the drawings, 1 represents a suitable housing of an ordinary coiled spring 2 for scales and from said spring depends a suspension bar 3. The housing 1 is constructed of sheet material and consists of a rear rounded vertical side 4 having forward lateral flanges 5 and 6, to which is fixed a face plate 7. The upper end of the housing 1 is closed by a cap 8 and its lower end by a similar cap 9. Extending rearwardly at a right angle from the housing 1 is a bracket 10 also constructed of sheet material bent into a rectangular form with flanges as 11 at its forward end for connection to the flanges 5 and 6 of the housing and having at its free or rear end a vertical base plate 12 for attachment to the wall of the milking shed or other suitable place by means of bolts passing through openings 13 thereof for supporting said housing. The upper cap 8 has a knockout depending lug 14 and in an opening 15 thereof is suspended the hooked end 16 of the scale spring 2. To the lower end of the scale spring 2 is fixed the suspension bar 3 by means of its last coil engaging a recess 17 in the edge of said bar and the inturned end 18 thereof passing through an opening 19 of said suspension bar. The suspension bar 3 extends through a longitudinal recess 20 of the lower cap 9 and the sides of this recess together with a slotted guide 21 fixed to the face plate 7 serve to guide said suspension bar. A suitable hook 22, on which may be conveniently hung a pail of milk for the weighing of same, is suspended from the depending and projecting end of the suspension bar 3 in an opening 23 thereof.

The weight indicating plate, which is adjustable to allow for tare, and the means or carriage for supporting a lead pencil to permit manual adjustment thereof vertically to the proper starting position on the record sheet, and for automatically moving the pencil downwardly from said position to a position corresponding to the weight of the milk by the weighing action thereof will now be described.

The face plate 7 is provided with a vertical slot 24 opposite the edge of the suspension bar 3 and fixed to said suspension bar is a block 25, the head 26 of which is rectangular and adapted to pass through said slot and project beyond said face plate and also slide upon the side edges of said slot thus guiding the upper portion of said suspension bar. The height of the head 26 of the slide block 25 is reduced at 27 and 28 leaving upper and lower horizontal shoulders 29 and 30, and fixed securely thereon at a right angle to the suspension bar 3 is a cross arm 31 of sheet metal serving as a carriage for supporting a lead pencil and having a rectangular recess 32 corresponding to said reduced portion of said head. The cross arm 31 is fixed to the outer end of the head 26 by means of a washer 33 and a headed screw 34. One end of the cross arm 31 terminates in a point 35 which passes through and is adapted to slide in a recess 36 of the upstanding side 37 of a weight indicating plate 38 carrying suitable markings as at 39 on its face. The weight indicating plate 38 is adjustably supported on the face plate 7 to permit vertical movement thereof and has a turned down flange 40 adapted to engage the edge of said face plate for the guiding of said weight indicating plate. The means for supporting the weight indicating plate 38 consists of a back plate 41, from which extends a threaded pin 42 which passes through and slides in registering slots 43 and 44 of the flange 5 of the rear side of the housing 1 and the face plate 7 respectively and through an opening 45 of said weight indicating plate for receiving a suitable binding nut 46.

The other end of the cross arm or carriage 31 extends beyond the side edge of the face plate 7, then downwardly and rearwardly at 48 and formed therewith is a vertical socket 49 having a rectangular opening 50 for supporting an adjustable post 51. To the upper end of the adjustable post 51 is fixed at 52 a horizontally and rearwardly extending tubular shell 53, in which is movably supported a tubular holder 54 for receiving a lead pencil indicated by 55 and having springy fingers 56 at its rear end for gripping same. The holder 54 is both slidably and rotatably supported in the shell 53 to permit imparting a forward and twisting movement to the lead pencil carried by the holder. For adjusting the post 51 up and down in the socket 49 and thus moving the lead pencil to a set position, said post is provided with a rearwardly extending foot 57 bifurcated at 58 for receiving the neck 59 of the head 60 of an upright threaded stem 61 which is rotatably supported in a rearwardly extending lug 62 of said socket. In order to afford guiding support for the cross arm 31 and at the same time reduce friction between same and the face plate 7 and the flange 6 of the rear side of the housing, said cross arm is provided with an upstanding portion 63 having sides 64 and 65 carrying a front roller 66, and a bracket 67 fixed to said cross arm at 68 and having similar sides to the portion 63 carrying a rear roller 69.

The record sheet used in connection with this machine and indicated by 70 is removably attached to the outer face 71 of a vertically arranged drum 72, which is rotatably supported by and between upper and lower bracket arms 73 and 74 extending from the rear side 4 of the housing 1 and fixed to the lateral flanges 5 and 6 thereof, and then extending laterally on an angle and having vertically alining bearing openings as at 75 at their outer ends. The drum 72 is loosely mounted on an upright shaft 76 which passes through central bearing openings as at 77 through the upper and lower ends 78 and 79 of said drum, and said shaft extends through and is rotatably mounted in the bearing openings 75 of the bracket arms 73 and 74. An adjustable collar 80 on the shaft 76 supports same in the bracket arm.

In order to provide for the manual rotation of the drum 72 to bring the record sheet carried thereby to a set position for each cow to be milked, and also be able to set the drum and record sheet for a desired period of milkings, as for instance, each day of a week or a certain day of each week for a month, the following described means is employed.

For rotating the drum 72 and locking and releasing same, a crank lever 81 is riveted at 82 to the lower end of the shaft 76, and to the free end of said lever is riveted at 83 a depending hollow handle 84, in which is a spring upwardly pressed locking pin 85 having fixed to its outer or lower end, a head 86 for convenience in manually moving said pin downwardly or in its opposite direction to normal. For locking the drum 72 in a set position for each cow to be milked, the upper end of the pin 85 is adapted to enter openings, indicated by 87, arranged on the arc of a circle and equally spaced through a circular stationary lock plate 88, which is secured to the lower bracket arm 74 of the housing. The circular lock plate 88 is provided with a central opening 89 for receiving the shaft 76 and is held against rotation by pins as at 90 passing therethrough and through a spacing washer 91 and through the bracket arm 74 and their ends riveted. A stop 92 limits the rotation of the crank lever 81.

For moving and also locking the drum in a set position step-by-step slightly to the left relative to the set and locked position for each cow as described, a radially extending and outwardly tapering lock plate 93 is pivoted on the shaft 76 but is spot welded at 94 to the lower end 79 of the drum 72 so as to be a part thereof and turn therewith. The lock plate 93 extends beyond the outer face 71 of the drum 72 as at 95 and the outer edge of this portion terminates in the arc of a circle and is provided with teeth 96 adapted to be engaged by a worm 97. For supporting the worm 97, a tapering index lever 98 having a depending boss 99 riveted thereto at its inner end and provided with a bore 100 for receiving the shaft 76 is arranged below the lock plate 93 and adjustably fixed to said shaft by means of a set screw 101. The index lever 98 therefore may be adjusted on the shaft 76 and set in a central position relative to the period rotations of the drum 72 and the record sheet 70 carried thereby. The outer end of the index lever 98 has a pair of upstanding bearing lugs 102 and 103 for supporting the shaft 104 to which the worm 97 is fixed. The index lever 98 extends beyond and around the worm 97 to form a cover 105 therefor, and said cover carries an index point 106, which is adapted to register with an upright plate 107 formed from and remaining a part of the lock plate 93 and having thereon numerals one to seven as indicated at 108 representing the milking periods. The index lever 98 below the worm 97 is cut out at 109 to accommodate same. For rotating the worm 97, a knurled nut 110 is fixed to the projecting end of the shaft 104 which is rotatable in a lug 111 formed integrally with the index lever 98. In order to be able to rotate the worm 97 to move the index lever 98 a certain and equal step-by-step distance, the knurled nut 110 is provided with a spring pressed ball 112, which is adapted to enter equally spaced recesses 113 in the outer face 114 of the lug 111. The knurled nut 110 is fixed to the worm shaft 104 by means of a set screw 115 for convenient removal thereof from said shaft, and also adjustment of the worm 97 to give accurate movement for registration of the index pointer 106 with the numerals 108. To limit the movement of the index lever 98, a headed stop screw 116 passing through a curved slot 117 thereof is fixed into the lock plate 93.

By turning the knurled nut 110 to the right step-by-step and thereby rotating the worm 97 in the same direction and also step-by-step, the lock plate 93 is moved to the left relative to the index lever 98 supporting said worm, and the drum 72, of which said lock plate is a part, is thus moved as is also the record sheet 70 carried thereby to the next milking period position and locked. As the index lever 98 is fixed to the shaft 76 and locked to the drum 72, the rotating of the shaft by means of the crank lever 81 will rotate said drum and record sheet to the next and successive positions for each cow of the herd for that same time of the same milking period.

The record sheet 70 for use with this machine consists of a sheet of paper of suitable height and sufficient length to encircle the outer face 71 of the drum 72, and having in its forward end portion 118, a plurality of vertically alining openings, as at 119, for registering with and fitting over guide pins 120 projecting from the face of the drum. The other or rear end portion 121 of the record sheet 70 is adapted to be pressed against slight projections 122 of the drum 72 opposite and across from the guide pins 120. The record sheet 70 is held securely in position on the drum by means of a clamp bar 123, which is slightly convex in cross section and provided with two rows of openings designated by 124, one row for receiving the guide pins 120 and the other row for registering with the projections 122. Suitable thumb nuts 125 pass through central openings 126 of the clamp bar 123 and enter threaded openings 127 in the face of the drum 72.

The record sheet 70 is ruled vertically at 128 to provide a column as 129 for each cow to be milked and recorded for a certain period of time, and said sheet is also ruled longitudinally as at 130 and said lines marked as at 131 indicating the weight of the milk at each milking according to the distance the carriage 31 and consequently the lead pencil 55 is moved downwardly. As the weight of the milk moves the lead pencil downwardly, the dots made thereby and according to their position relative to the longitudinal lines 130 and marks 131, will indicate the weight of the milk. Beginning at the left, the columns 129 of the record sheet 70 are numbered consecutively and marked at the bottom thereof as at 132, and each number also represents the number of the cow of the herd. The period of the duration for the recording of the milkings is placed at the top of the record sheet as at 133.

In practice, first, the record sheet 70 is placed around and securely attached to the drum 72 by means of the openings 119 at the forward end of said record sheet engaging the guide pins 120, and said end and the other end thereof over the projections 122 being held by the clamp bar 123. Next, the drum 72 is released by downward pressure on the head 86 of the locking pin 85 of the handle 84 to withdraw said pin from one of the openings 87 of the lock plate 88, and then rotating said drum by means of said handle to position the portion of the record sheet 70, which is adjacent the forward vertical line 128 of column one thereof, opposite the point of the lead pencil 55 and until said locking pin comes into alinement with the corresponding opening 87 for setting said drum and said record sheet thereon for cow number one of the herd, and upon relieving said downward pressure on said handle, said locking pin will, due to upward spring pressure, enter said corresponding opening and thereby hold said drum in set position and as shown in the drawings. Next, the drum 72 and the record sheet 70 carried thereby is set for the first milkings of the period by rotating the knurled nut 110 in the proper direction to cause the worm 97 to actuate the index lever 98 and therefore the drum 72 to the first period position, as will be indicated by the index pointer 106 registering with the numeral one of the numerals 108 on the plate 107, and also locking said drum in this set position, and as shown in the drawings. Finally, the pail to be used for the milkings is hung upon the hook 22 and its weight will cause the suspension bar 3 to move downwardly thereby actuating the cross bar 31 attached thereto in the same direction to a position below normal and the point 35 thereof will register the weight of the pail on the indicating plate 38. To allow for the weight of the pail, or tare, and thereby be able to register the weight of the milk only for an accurate record, the indicating plate 38 is adjusted downwardly and reset by means of the thumb nut 46 so that the zero thereof is opposite the point of the cross bar. The post 51 supporting the lead pencil 55 is then adjusted up or down by turning the head 60 of the threaded stem 61 to bring the point of the lead pencil opposite the top or zero line of the lines 130 of the record sheet 70. This completes the setting of the machine for cow number one and for the first milking of the period. So long as the pail weighed for tare or a pail of like weight is used, no further adjustment of the indicating plate 38 or the lead pencil 55 is necessary.

The first milk from cow number one is weighed by hanging the pail upon the hook 22 and when the cross arm 31 comes to rest in its down position, the point 35 thereof will register the weight of the milk on the indicating plate 38 and the point of the lead pencil 55 will be opposite a corresponding position or the same weight on the record sheet 70, and the milker, by a quick press and twist of the lead pencil, will mark a dot thereon at said point as for example at 134. For setting the drum 72 and the record sheet 70 for cow number two, the locking pin 85 is withdrawn from its opening 87 of the lock plate 88 for cow number one to permit clockwise rotation of said drum by the handle 84 of the crank lever 81 to the next opening of said lock plate for the entrance therein of said locking pin, thereby placing number two column of the record sheet in a relative position to the point of the lead pencil 55 as was originally column one for cow number one. And for changing and setting the drum and the record sheet for each different cow of the herd for the same milking and for the same period, the procedure described is the same.

After each cow of the herd has been milked and the separate milkings weighed and registered by a dot on the record sheet 70 for the first milkings of each period, the drum 72 is released from its last locked position by the withdrawing of the locking pin 85, the rotating of the drum counterclockwise by the handle 84 to its original position and the locking again of same in that position by said locking pin. To set the drum 72 and the record sheet 70 carried thereby to the second position of each column for the second weighing and registering of each milking of the herd, said drum is actuated clockwise by turning the knurled nut 110 to the right one step to its next position, thereby rotating the worm 97 and moving the index lever 98 and said drum and record sheet from its first milking position for the period to its second position for the same period. The drum and record sheet are now set for the weighing and registering of the milk for the second milking of cow number one. And for example, the dot made at 135 in column one of the record sheet, upon the weighing of the milk, represents the second milking of cow number one. The drum 72 is released, rotated to the next position for cow number two and locked by means of the locking pin 85 of the handle 84 as heretofore described, and this resetting of the drum is repeated for each cow of the herd. After each all around milking of the herd, the drum 72 is returned to its original position, the index lever 98 actuated and therefore the drum rotated and the record sheet 70 moved to its next position for the entire milking period. And, the dots 134 and 135, and the dots following as at 136, made for each weighing of the milk taken from each cow of the herd for the desired period of time, represents each weighing and provides a record thereof for comparison and thereby showing gain or loss of milk for each cow over the period. Lines may be drawn from dot to dot representing the separate weighings of milk for the period, as at 137, for easy reading.

From the drawings and description, it is clear that this machine is capable of facilitating the weighing and recording of the separate milkings of each cow of a herd for a desired period of time such as days of a week, days or weeks of a month, or weeks or months of a year, that the machine may be conveniently and quickly adjusted for each cow consecutively for a full round of milkings, or for each milking of each cow for the same period of time, or for any certain cow for any particular time of a period, and that the machine is of practical construction, easy to manipulate, accurate in operation, and adapted to selection of various periods of time for the making of a record of the weight of the milking of each cow of the herd to show gains and losses from milking to milking and over the period.

Although this machine as described is particularly applicable for the milkings of cows, it is apparent that it will serve also for weighing and recording of any article from any source of supply over a period of time for the purpose of obtaining a comparative record.

Having fully described my invention, what I claim is:

1. In a milk weighing and recording machine, the combination of a housing, a scale spring supported in the housing, a suspension bar depending from the scale spring and below the housing, a carrying hook at the end of the suspension bar, the housing being provided with a slot opposite said suspension bar, a cross arm attached to said suspension bar opposite said slot, means supporting a record sheet, said means being movable at a right angle to the movement of said cross arm, means for moving said record supporting means step-by-step, means for moving said record supporting means step-by-step within the limits of one of its first mentioned step-by-step movements, a pencil holder supported by said cross arm and movable at a right angle thereto towards and away from the record sheet, and a pencil held by said holder for the marking of said record sheet.

2. In a milk weighing and recording machine, the combination of a housing, a scale spring supported in the housing, a suspension bar supported by the scale spring and depending from the housing and having a carrying hook, the housing being provided with a slot opposite said suspension bar, a cross arm fixed to said suspension bar opposite said slot, a drum for carrying a record sheet, the drum being rotatably mounted upon an axis parallel to the weight responsive movement of said spring, means for rotating the drum for its full movement, means for rotating said drum step-by-step, means for rotating said drum step-by-step within one of said step movements, a pencil holder supported by said cross arm and movable towards and away from said drum, and a pencil in said holder for the marking of said record sheet by manual action.

3. In a milk weighing and recording machine, the combination of a housing, a scale spring supported in the housing, a suspension bar supported by the scale spring and depending from the housing and having a carrying hook, the housing being provided with a slot opposite the suspension bar, a cross arm fixed to said suspension bar opposite said slot, a drum for carrying a record sheet, the drum being rotatably supported upon an axis parallel to the weight responsive movement of said spring, means for rotating said drum step-by-step and locking same after each step movement, means for rotating said drum step-by-step within the distance of one of the first mentioned step movements and locking same after each step movement, means locking the last mentioned means to the first mentioned means, a pencil holder supported by said cross arm and movable towards and away from said drum, and a pencil supported in said holder for manual action in the marking of said record sheet.

4. In a milk weighing and recording machine, the combination of a housing, a scale spring supported in the housing, a suspension bar supported by the scale spring and depending from the housing and having a carrying hook, the housing being provided with a slot opposite the suspension bar, a cross arm fixed to said suspension bar opposite said slot, a drum for carrying a record sheet, a shaft, the shaft being arranged parallel to said suspension bar, the drum being loosely mounted on the shaft, a crank lever for rotating said shaft step-by-step, an index lever fixed to said shaft for rotating same step-by-step, means for locking said index lever to said drum for rotating same by said crank lever, a pencil holder supported by said cross arm and movable towards and away from said drum, and a pencil supported in said holder for manual action in the marking of said record sheet.

5. In a milk weighing and recording machine, the combination of a housing, a scale spring supported in the housing, a suspension bar supported by the scale spring and depending from the housing and having a carrying hook, the housing being provided with a slot opposite the suspension bar, a cross arm fixed to said suspension bar opposite said slot, a drum for carrying a record sheet, a shaft, the shaft being arranged parallel to said suspension bar, the drum being loosely mounted on the shaft, a crank lever fixed to said shaft for rotating same step-by-step, a lock plate fixed to said drum, an index lever fixed to said shaft, means for actuating the index lever relative to the lock plate to cause rotation of said drum and also lock same for rotation thereof by said crank lever, a pencil holder supported by said cross arm and movable towards and away from said drum, and a pencil supported in said holder for manual action in the marking of the record sheet on the drum.

6. In a milk weighing and recording machine, the combination of a housing, a scale spring supported in the housing, a suspension bar supported by the scale spring and depending from the housing and having a carrying hook, the housing being provided with a slot opposite the suspension bar, a cross arm fixed to said suspension bar opposite said slot, a drum for carrying a record sheet, a shaft, the shaft being arranged parallel to said suspension bar, the drum being loosely mounted on the shaft, an index lever fixed to said shaft, a lock plate fixed to said drum, the lock plate having teeth, the index lever supporting a worm adapted to engage the teeth of the lock plate, means for manually rotating said worm to move said drum step-by-step and lock same in each postion, means for manually rotating said shaft step-by-step thereby rotating said drum in like manner and locking the drum in each position, a cross arm fixed to said suspension bar opposite said slot, a pencil holder supported by the cross arm and movable towards and away from said drum, and a pencil supported in said holder for manual action in the marking of the record sheet carried by the drum.

7. In a milk weighing and recording machine, the combination of a housing, a scale spring supported in the housing, a suspension bar supported by the scale spring and depending from the housing and having a carrying hook, the housing being provided with a slot, opposite the suspension bar, a cross arm fixed to the suspension bar opposite said slot, a drum for carrying a record sheet, a shaft, the shaft being arranged parallel to said suspension bar, the drum being loosely mounted on the shaft, a lock plate fixed to said drum, the lock plate having teeth, an index lever fixed to said shaft, a worm rotatably supported by the index lever and engaging the teeth of the lock plate, means whereby the rotating of said worm will move said drum step-by-step and lock same, a stationary lock plate carried by said housing, the stationary plate having equally spaced openings arranged in a circle, a crank lever fixed to said shaft for rotating same, the crank lever having a spring pressed pin adapted to enter said openings of said stationary lock plate upon rotation of said crank lever step-by-step and lock said drum in each position, means for permitting withdrawal of said spring pressed pin from said openings, a pencil holder supported by said cross arm and movable towards and away from said drum, and a pencil supported in said holder for manual action in the making of a mark on the record sheet carried by said drum.

EDWARD C. KOSTER.

REFERENCES CITED

The following references are of record in the file of this patent:

UNITED STATES PATENTS

| Number | Name | Date |
| --- | --- | --- |
| 210,493 | Brown | Dec. 3, 1878 |
| 587,100 | Lindemann | July 27, 1897 |
| 669,584 | Hunt | Mar. 12, 1901 |
| 808,091 | Kennedy | Dec. 26, 1905 |
| 915,620 | Meloney | Mar. 16, 1909 |
| 988,074 | Bovie | Mar. 28, 1911 |
| 1,006,968 | Meloney | Oct. 24, 1911 |
| 1,097,767 | Prickett | May 26, 1914 |
| 1,267,693 | Quiram | May 28, 1918 |